Nov. 23, 1948. V. SEVERANCE ET AL 2,454,721
POULTRY FEEDER
Filed Nov. 1, 1946

INVENTORS
Vernon Severance
Charles L. Severance
BY
George B. Willcox
ATTORNEY

Patented Nov. 23, 1948

2,454,721

UNITED STATES PATENT OFFICE 2,454,721

POULTRY FEEDER

Vernon Severance, Saginaw, and Charles L. Severance, Akron, Mich.

Application November 1, 1946, Serial No. 707,158

3 Claims. (Cl. 119—52)

This invention relates to improvements in poultry feeders wherein feeding hoppers and troughs are employed.

The object of our invention is to provide a poultry feeder of such type that is adapted for use either out of doors where a storage bin or hopper of relatively small capacity is desired and where feeding troughs are required to be equipped with shed roofs that are wide enough and low enough to fairly protect the feed in the troughs against rain and storms.

The same equipment, after being rearranged as to certain of its side wall and top members, immediately becomes especially adapted for indoor use.

This latter use requires considerably larger volume for feed storage; does not require any wide shed roof or shoulder over the feed troughs; but does require to be considerably narrower than the same device when adjusted for out-of-door use, as just mentioned, in order that it can be easily passed through an ordinary door.

The device of our invention, therefore, is made so as to be quickly converted from the requirements for indoor use to service out-of-doors, as will be explained.

More specifically, the objects of the invention are, to provide a poultry feeder comprising a grain storage or feeding bin which is common to both aspects and uses of the complete device, so the grain will feed out from the bottom edge of a baffle plate into a side trough in the usual manner.

According to our improvement, we equip such a bin and trough device with the following special and additional features that are characteristic of our invention. Such special features are associated with the upper part of the bin and consist of two hinged panels, which in their lowered position provide shed roofs over the two grain troughs, and in their upright position provide side walls for an additional storage bin for feed, which is in effect an upward extension of the main feed bin alluded to.

Two other panels, hinged to the upper edges of the main feed bin, at its two ends, are adapted to be folded down inside the bin so to lie against its end walls out of the way when the side panels are in their shed-roof position; but when the side panels are upright the two end panels also are swung to vertical position and form end walls for the upper extension of the storage bin.

When the four panels are upright, they are covered by a V-shaped roof member; and when the four panels are in their down-position the bottom part of the feed bin is covered by a combination of the V-shaped roof member and the side panels, in overlapped relation.

It is thus seen that the objects are to provide a convertible poultry feeder which in one form shall be suited to indoor use, and in another form, made by changing the roof member and the four hinged panels, becomes suited for out-of-door use, as will be explained.

With the above and certain other objects in view, which will appear later in the specifications, our invention comprises the devices described and claimed and the equivalents thereof.

In the drawings forming a part of the specifications, Fig. 1 is a front view in perspective, showing our improved feeder arranged for indoor use;

Figure 1:
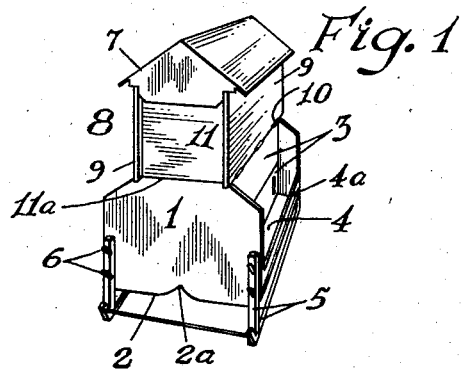

The main feed bin consists in end walls 1 with curved bottom 2, which is slightly raised and curved as at 2a along the longitudinal center line of the bin 1, and side walls 3 of conventional type with vertical spaces at their bottom to allow grain to flow outwardly to supply the feed troughs 4.

The bin 1 is mounted on skids 5 that are vertically adjustable at 6 by adjustment means to suit the size of the birds at various stages of their growth.

Figure 2:
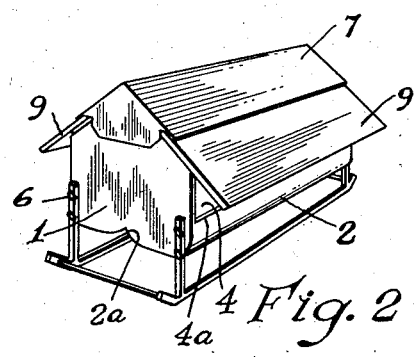
Fig. 2 is the same device rearranged for outdoor use.
Figure 3:
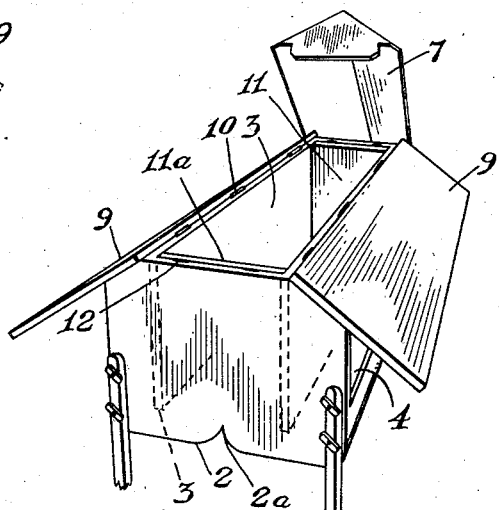
Fig. 3 is a similar view of the parts shown in Fig. 2, the V-shaped roof member being shown detached, and the legs broken away.

Referring now to Figs. 2 and 3, numeral 7 designates the unitary cover that fits the feeder in either its indoor arrangement, Fig. 1, or the outdoor arrangement Fig. 2.

Numeral 8, in general, designates the upward extension of the bin to provide increased space for feed such as grain or mash.

One of the important features of our invention resides in the combination of hinged panel devices, whereby the arrangement of Fig. 1 can be changed into that of Fig. 2, and vice versa, without requiring the use of extra parts to convert from indoor to outdoor service. The parts referred to are the panels 9, 9, which are hinged at 10 to the upper edges of the side walls 3, as shown in Figs. 1 and 3. The hinged edges of 9, 9 are spaced apart equal to the distance between side walls 3, 3, and the overhang of panels 9 is supported by the beveled top edges of the end walls 1, as shown in Figs. 2, 3, and 4.

The end panels 11 are hinged at their edges 11a to the upper edges of end walls 1, the hinges being indicated by numeral 12. When the two end panels 11 are raised from their concealment position, Fig. 3, to their upright position, Figs. 1 and 4, they become upward extensions of the walls 1; but when they are turned down on their hinges 12 they again fold flat inside the bin and against the inner faces of the walls, as shown in Fig. 3 and indicated by dotted lines, in Fig. 4.

Figure 4:
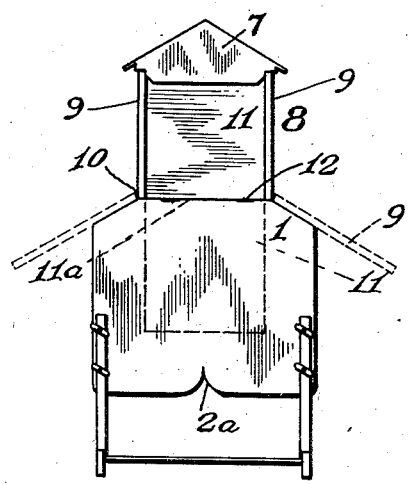
Fig. 4 is an end view showing in full lines the indoor arrangement as in Fig. 1, and in dotted lines showing the positions of the two side panels and the end panels turned down for out-of-door use, as shown in Figs. 2 and 3.

The indoor arrangement, Figs. 1 and 4, provides maximum storage capacity in minimum floor space. Thus surplus feed can be stored in the upward extension 8, even though it may not be required for immediate use. By removing the unitary cover 7, as shown in Fig. 3, grain can be scooped out from the part 8, just as in an ordinary storage bin.

In the form of Fig. 1 the device is narrow enough to permit it to pass through a doorway readily when it is desired to move it indoors, or out-of-doors, or from one room to another inside the poultry house.

When adjusted for outdoor use panels 9 slope downwardly and act as wide overhanging eaves to protect the contents of the feed troughs 4 by shedding water and also to protect the birds while feeding even in driving rain. The attendant need not pay any special attention to the feeder when a storm is approaching, for everything is protected.

The feed of grain down through the upper bin 8 and the lower bin, Fig. 1, or from the lower bin only as in Fig. 2, is free flowing not only when easily flowing grains are being fed, but also with the most obstinate mashes.

Figure 2A:
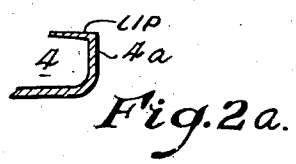
Fig. 2a is a fragmentary detail showing a preferred arrangement of a lip on the outer edge of the feed trough.

The outer edges 4a of feed troughs 4 may, if desired, be provided with an inwardly projecting horizontal lip (shown in Fig. 2a) to prevent the birds from hooking, by which is meant using their bills to slide some of the feed out onto the floor.

The adjustment means 6 regulating the height of the feed troughs above the ground or floor is a desirable feature of our improvement. The adjustment 6 varies the height of the feeding edge 4a to suit the changing heights of growing birds and permits the birds to feed while they are standing on the ground or floor and thus eat without unnecessary effort.

In practice our convertible feeder meets all practical requirements for economical all-year-around feeding program.

In warm weather when outside feed is available the birds do considerable scratch feeding and use the equipment assembled as shown in Fig. 2 to best advantage. Consequently the main or lower feed bin is utilized because it has ample feeding capacity for outdoor conditions. Also during outdoor service the panels 9 protect the feeding troughs 4 from the weather, as above described.

When the cold season approaches the device is converted to the form shown in Fig. 1, and is drawn on its skids into the poultry building. The panels 9, 9 being folded up as shown in Fig. 1 enable the equipment to be pulled through doors, because of the narrower width of the device. Also, for indoor use those panels are not needed and are up out of the way, giving plenty of light near the feeding troughs 4. The storage capacity indoors is about double that required for outdoor use because of the added extension 8. This is necessary because poultry houses during severe weather may have to remain closed for a considerable length of time, requiring a larger supply of feed to be accessible in the troughs. In fact, a large part of the feed supply can be stored during the cold season in the extension 8. Yet any time it is desired to take food out of storage the attendant need only lift off the cover 7 and scoop out the grain. This avoids the necessity of having to store grain in the usual containers or bins.

Having thus described our invention, what we claim and desire to secure by Letters Patent is:

1. A feeder having a main feed bin comprising side walls, end walls, and feeding troughs communicating with the bin; in combination with an end panel hinged to the top of each end wall, adapted to be folded downwardly against such end walls, or extended upwardly to present an upper extension wall of said bin; a side panel hinged to the upper end of each side wall of said main feed bin and adapted to be swung into position outwardly and downwardly therefrom; and also extended upwardly to present an upper side wall extension of said bin; and a cover for the main bin when the side and end walls are in their respective down positions, and for the upper extension of the main bin when the end and side panels are raised; the said side panels in their down position presenting water shedding roofs to protect said feed troughs from the weather, and adapted when raised to reduce the over-all width of the feeder, and to increase the storage capacity of the bin.

2. In a poultry feeder having a bin with fixed end and side walls and feeding troughs; means for altering such bin so as to suit different requirements of use; said means comprising in combination an end panel associated with each end wall and adapted to be moved from a position face-to-face against said end wall into an upwardly extended position above the upper part of said end wall; and a side panel attached to and movable with respect to each side wall of such bin adapted to be shifted from a downward and outward sloping position relative to said side wall into an upwardly extended position at the upper edge of said side wall; the side and end panels, in their upwardly extended position, together constituting an upper extension of such bin for feed storage, said movable side panels in their down position presenting a roof projecting over said feeding troughs.

3. In a poultry feeder having a bin with fixed end and side walls, and feeding troughs; means for converting the bin to suit seasonal requirements of use; said means comprising a side panel attached to each side wall of said bin and adapted to be shifted from a downward and outward sloping position relative to said side wall to an upright extended position beyond the upper edge of said wall; the said side panels, in such upwardly extended positions, together constituting sides of an upper feed storage extension of such bin and in their down positions presenting roof portions that project over said feeding troughs.

VERNON SEVERANCE.
CHARLES L. SEVERANCE.

REFERENCES CITED

The following references are of record in the file of this patent:

UNITED STATES PATENTS

| Number | Name | Date |
|---|---|---|
| 53,346 | Romans | Mar. 20, 1866 |
| 513,557 | Cobb | Jan. 30, 1894 |
| 640,730 | Smith | Jan. 2, 1900 |
| 1,188,274 | Holligan | Jan. 20, 1916 |
| 1,790,045 | Harvey | Jan. 27, 1931 |